US009286730B2

(12) United States Patent
Bar-Zeev et al.

(10) Patent No.: US 9,286,730 B2
(45) Date of Patent: Mar. 15, 2016

(54) OPACITY FILTER FOR DISPLAY DEVICE

(71) Applicant: Microsoft Technology Licensing, LLC, Redmond, WA (US)

(72) Inventors: Avi Bar-Zeev, Redmond, WA (US); Bob Crocco, Seattle, WA (U S); Alex Aben-Athar Kipman, Redmond, WA (US); John Lewis, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/605,701

(22) Filed: Jan. 26, 2015

(65) Prior Publication Data

US 2015/0193984 A1 Jul. 9, 2015

Related U.S. Application Data

(62) Division of application No. 12/887,426, filed on Sep. 21, 2010, now Pat. No. 8,941,559.

(51) Int. Cl.
*G09G 5/00* (2006.01)
*G06T 19/00* (2011.01)
(Continued)

(52) U.S. Cl.
CPC ............ *G06T 19/006* (2013.01); *G02B 26/026* (2013.01); *G02B 27/017* (2013.01); *G02B 2027/0118* (2013.01); *G02B 2027/0178* (2013.01); *G02B 2027/0187* (2013.01)

(58) Field of Classification Search
CPC ............... G02B 2027/0118; G02B 2027/0187; G02B 26/026; G02B 27/017
USPC ................................. 345/582, 656
See application file for complete search history.

(56) References Cited

U.S. PATENT DOCUMENTS 4,855,934 A * 8/1989 Robinson ...................... 345/582
5,162,828 A   11/1992 Furness et al.
(Continued)

FOREIGN PATENT DOCUMENTS

CN   101124508 A   2/2008
JP   4001717       1/1992
(Continued)

OTHER PUBLICATIONS

Kasai et al., "A Forgettable Near Eye Display", Oct. 2000, pp. 115-118, http://ieeexplore.ieee.org/stamp/stamp.jsp?tp=&arnumber=888472.

(Continued)

*Primary Examiner* — Robin Mishler
*Assistant Examiner* — Kuo Woo
(74) *Attorney, Agent, or Firm* — Micah Goldsmith; Judy Yee; Micky Minhas

(57) ABSTRACT

An optical see-through head-mounted display device includes a see-through lens which combines an augmented reality image with light from a real-world scene, while an opacity filter is used to selectively block portions of the real-world scene so that the augmented reality image appears more distinctly. The opacity filter can be a see-through LCD panel, for instance, where each pixel of the LCD panel can be selectively controlled to be transmissive or opaque, based on a size, shape and position of the augmented reality image. Eye tracking can be used to adjust the position of the augmented reality image and the opaque pixels. Peripheral regions of the opacity filter, which are not behind the augmented reality image, can be activated to provide a peripheral cue or a representation of the augmented reality image. In another aspect, opaque pixels are provided at a time when an augmented reality image is not present.

20 Claims, 14 Drawing Sheets

(51) Int. Cl.
G02B 26/02 (2006.01)
G02B 27/01 (2006.01)

(56) References Cited

U.S. PATENT DOCUMENTS

| | | | |
|---|---|---|---|
| 5,572,343 | A | 11/1996 | Okamura et al. |
| 5,808,802 | A | 9/1998 | Hur |
| 6,317,103 | B1 | 11/2001 | Furness, III et al. |
| 7,199,934 | B2 | 4/2007 | Yamasaki |
| 7,401,920 | B1 | 7/2008 | Kranz et al. |
| 7,515,173 | B2 | 4/2009 | Zhang et al. |
| 7,639,208 | B1 | 12/2009 | Ha et al. |
| 7,693,343 | B2 | 4/2010 | Klompenhouwer et al. |
| 2003/0132944 | A1 | 7/2003 | Smith |
| 2006/0198027 | A1 | 9/2006 | Li et al. |
| 2008/0013185 | A1 | 1/2008 | Garoutte et al. |
| 2010/0149618 | A1 | 6/2010 | Sprague |
| 2010/0194872 | A1 | 8/2010 | Mathe et al. |
| 2010/0197399 | A1 | 8/2010 | Geiss |
| 2010/0321409 | A1* | 12/2010 | Komori et al. ............ 345/656 |
| 2011/0096100 | A1 | 4/2011 | Sprague |
| 2012/0068913 | A1 | 3/2012 | Bar-Zeev et al. |

FOREIGN PATENT DOCUMENTS

| | | |
|---|---|---|
| JP | 05-328260 A | 12/1993 |
| JP | 07-38825 A | 2/1995 |
| JP | 08-160340 A | 6/1996 |
| JP | 2000-276613 A | 10/2000 |
| JP | 2008-046562 A | 2/2008 |
| JP | 2008-078908 A | 4/2008 |
| WO | 2009142601 A1 | 11/2009 |
| WO | 2010/087293 A1 | 8/2010 |
| WO | 2012/039877 A1 | 3/2012 |

OTHER PUBLICATIONS

Vogel et al., "Bi-directional OLED Microdisplay for Interactive See-through HMDs: Study Toward Integration of Eye-Tracking and Informational Facilities", Mar. 2009, pp. 26-33, Journal of the Society for Information Display, http://www.informationdisplay.org/issues/2009/03/art10/art10.pdf.

Rolland et al., "Optical Versus Video See-Through Head-Mounted Displays in Medical Visualization", vol. 9, No. 3, Jun. 2000, pp. 287-309, Massachusetts Institute of Technology, http://citeseerx.ist.psu.edu/viewdoc/download?doi=10.1.1.85.3591&rep=rep1&type=pdf.

Kiyokawa et al., "An Occlusion-Capable Optical See-through Head Mount Display for Supporting Co-located Collaboration", Oct. 2003, pp. 1-9, Symposium on Mixed and Augmented Reality, Proceedings of the 2nd IEEE/ACM International Symposium on Mixed and Augmented Reality, Japan.

Kiyokawa et al., "An Optical See-through Display for Mutual Occlusion with a Real-time Stereovision System", vol. 25, Issue 5, Oct. 2001, Computers & Graphics, Elsevier Science Ltd.

Mulder, "Realistic Occlusion Effects in Mirror-Based Co-Located Augmented Reality Systems," Presence: Teleoperators and Virtual Environments, vol. 15, issue 1 (Feb. 2006), pp. 93-107.

Non-final Office Action dated May 16, 2013, U.S. Appl. No. 12/887,426, filed Sep. 21, 2010.

Response to Office Action dated Aug. 15, 2013, U.S. Appl. No. 12/887,426, filed Sep. 21, 2010.

Final Office Action dated Oct. 29, 2013, U.S. Appl. No. 12/887,426, filed Sep. 21, 2010.

Response to Office Action dated Jan. 29, 2014, U.S. Appl. No. 12/877,426, filed Sep. 21, 2010.

International Search Report & The Written Opinion of the International Searching Authority dated Feb. 23, 2012, International Application No. PCT/US2011/048880.

English Abstract of Japanese Publication No. JP2008-046562 published Feb. 28, 2008.

Chinese Office Action dated Feb. 8, 2014, Chinese Patent Application No. 201110291177.8.

Response to Office Action dated Jun. 20, 2014, Chinese Patent Application No. 201110291177.8.

English translation of Amended Claims for Response to Office Action dated Jun. 20, 2014, Chinese Patent Application No. 201110291177.8.

Notice of Allowance dated Sep. 9, 2014, U.S. Appl. No. 12/887,426, filed Sep. 21, 2010.

Chinese Office Action dated Sep. 23, 2014, Chinese Patent Application No. 201110291177.8.

Amendment under 37 C.F.R. 1.312 dated Dec. 9, 2014, U.S. Appl. No. 12/887,426, filed Sep. 21, 2010.

Chinese Office Action dated Mar. 13, 2015, Chinese Patent Application No. 201110291177.8.

Claims filed in Response to Office Action dated Jul. 10, 2015, Japanese Patent Application No. 2013-530156.

Notice of Allowance dated Sep. 22, 2015, Chinese Patent Application No. 201110291177.8.

English translation of Allowed Claims dated Sep. 22, 2015, Chinese Patent Application No. 201110291177.8.

"Office Action Issued in Japanese Patent Application No. 2013-530156", Mailed Date: Apr. 30, 2015, 9 Pages.

Response to Office Action dated May 22, 2015, Chinese Patent Application No. 2011102911778.

English translation of the Amended Claims filed in Response to Office Action dated May 22, 2015, Chinese Patent Application No. 2011102911778.

* cited by examiner

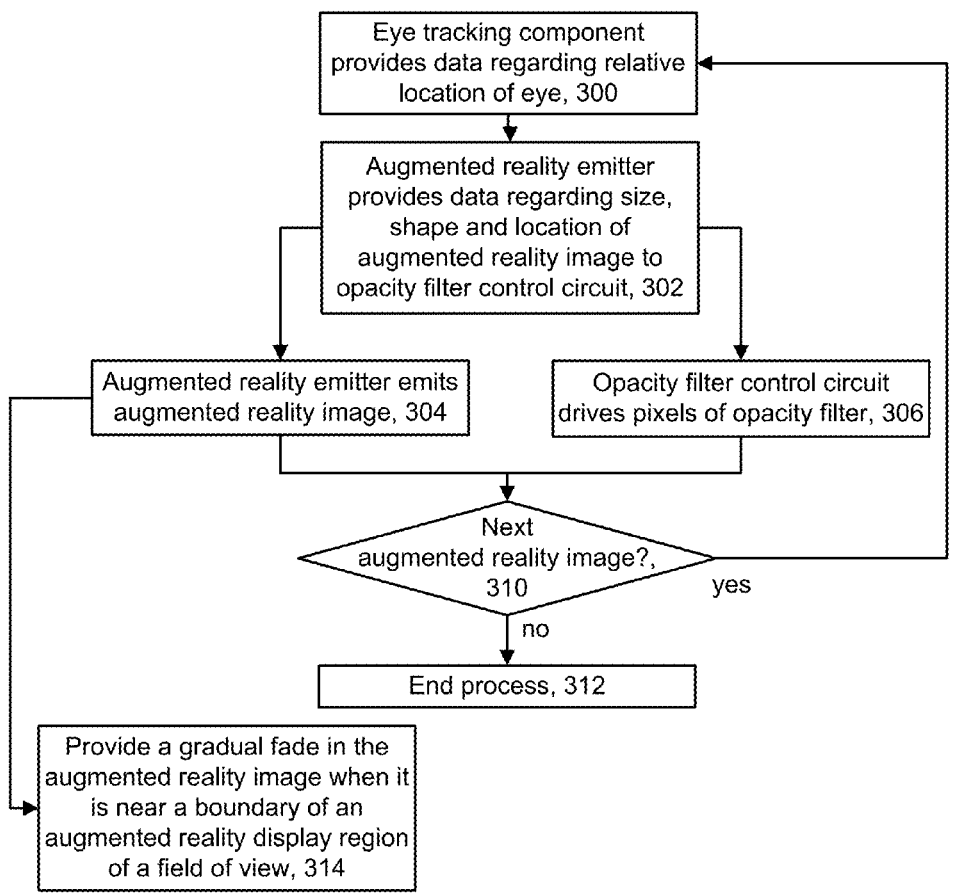
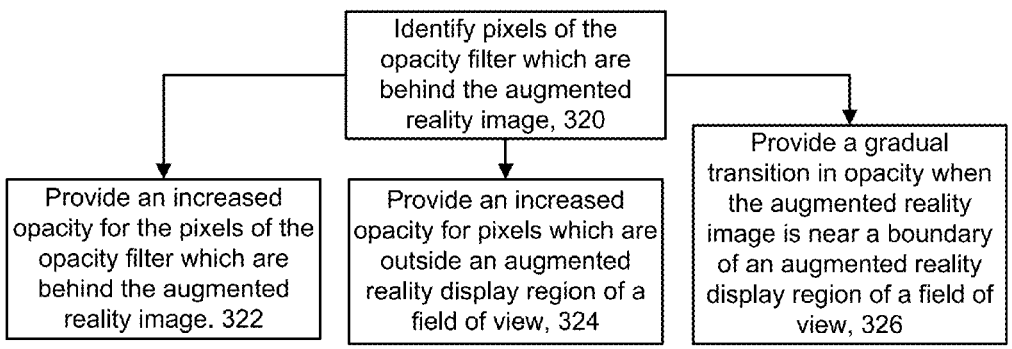

Fig. 4A
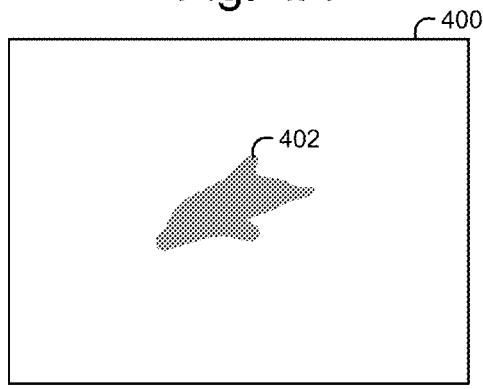
Fig. 4B
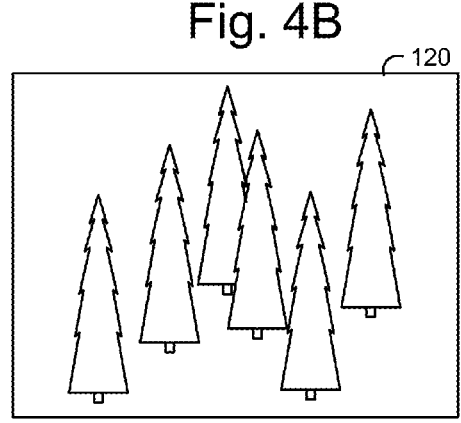
×
+
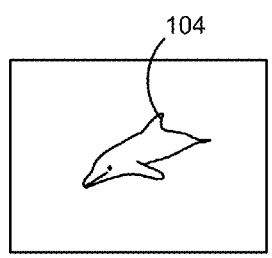
Fig. 4C
=
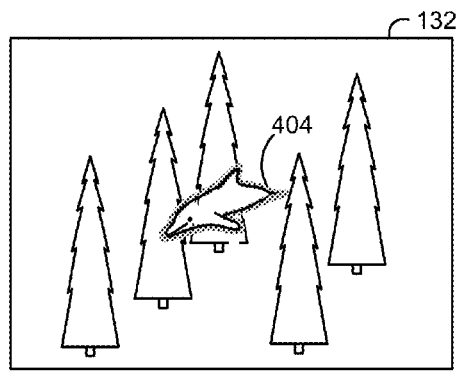
Fig. 4D

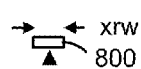
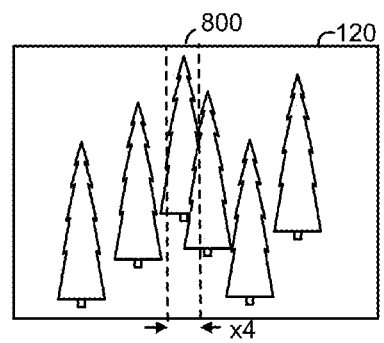
Fig. 8A2
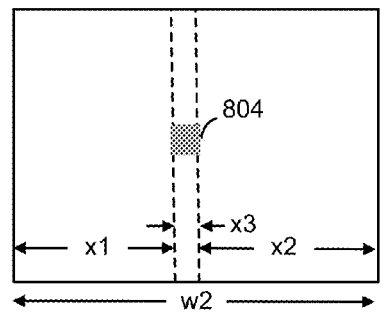
Fig. 8A3
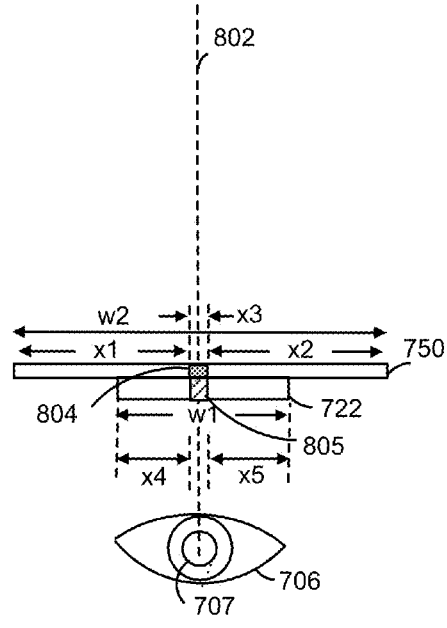
Fig. 8A1
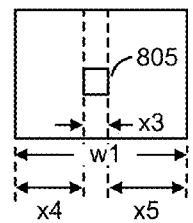
Fig. 8A4

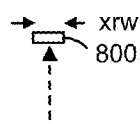
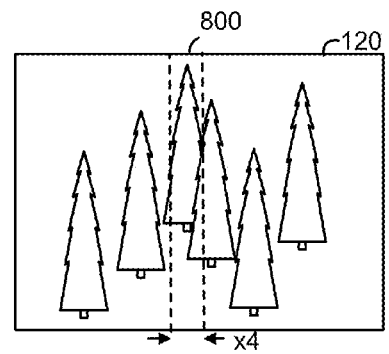
Fig. 8B2
Fig. 8B1
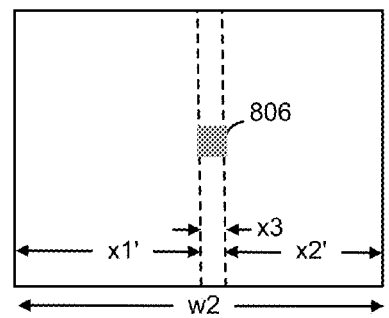
Fig. 8B3
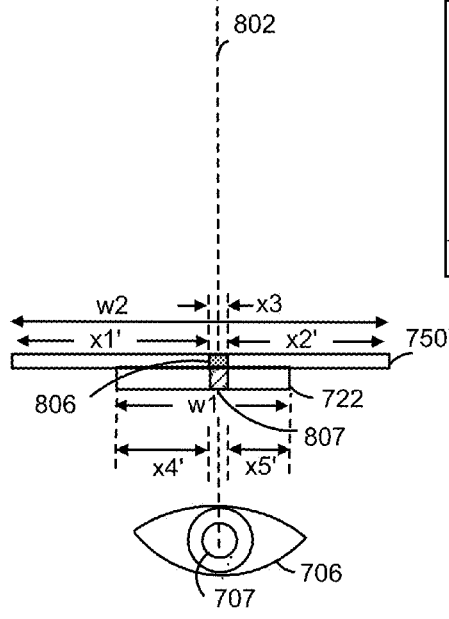
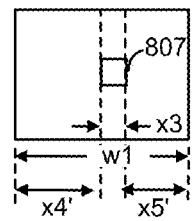
Fig. 8B4

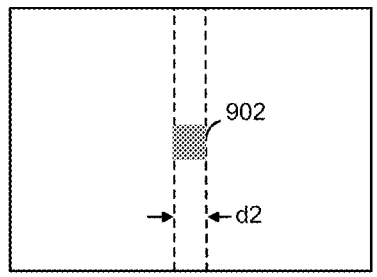
Fig. 9A2
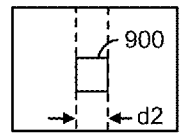
Fig. 9A3
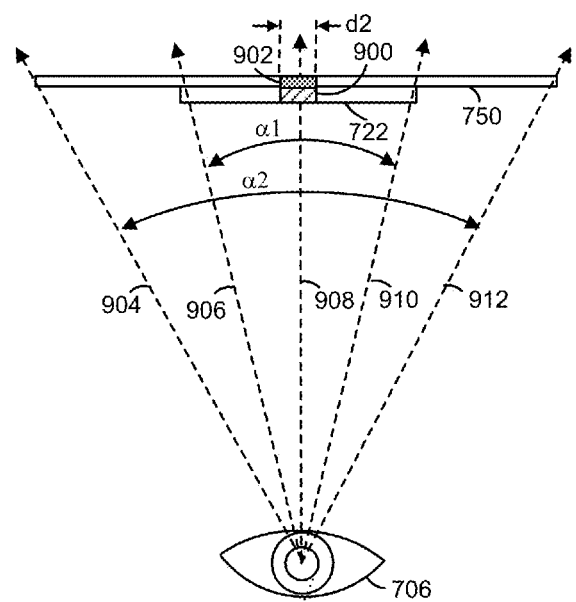
Fig. 9A1
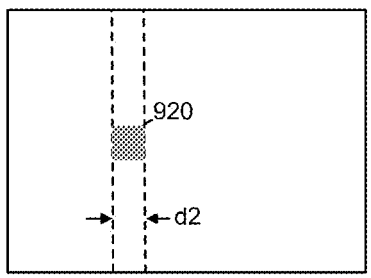
Fig. 9B2
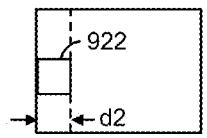
Fig. 9B3
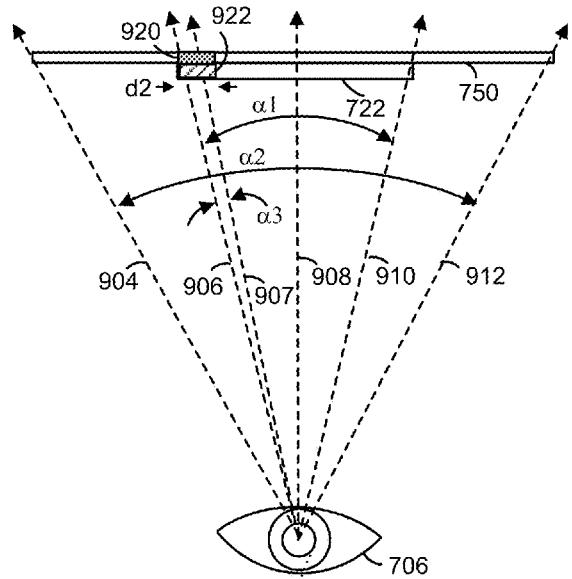
Fig. 9B1

Fig. 9C1
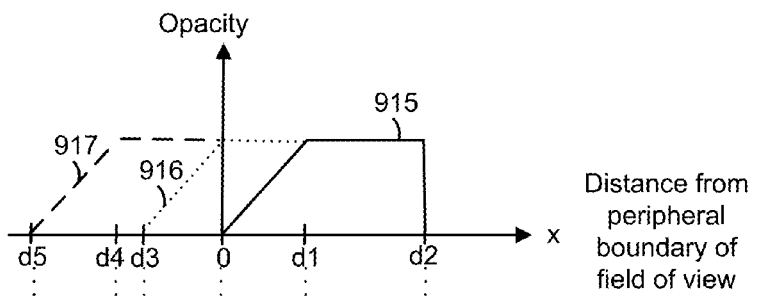
Fig. 9C2
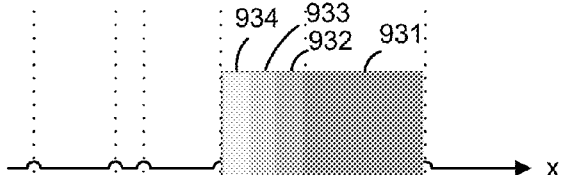
Fig. 9C3
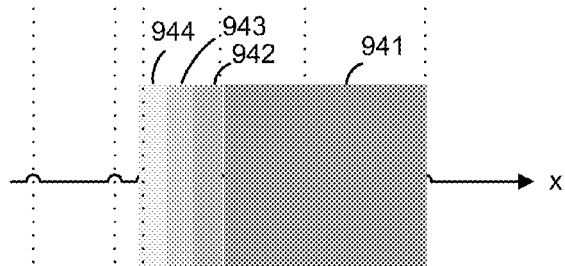
Fig. 9C4
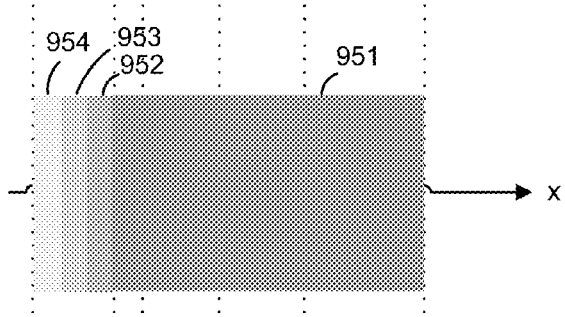

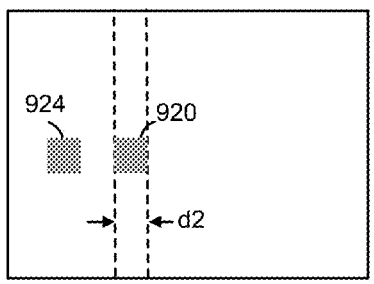
Fig. 9D2
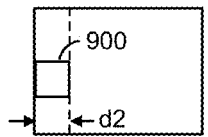
Fig. 9D3
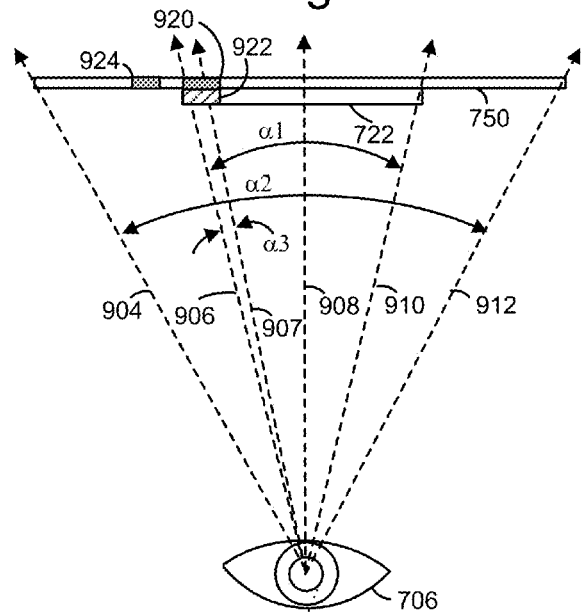
Fig. 9D1
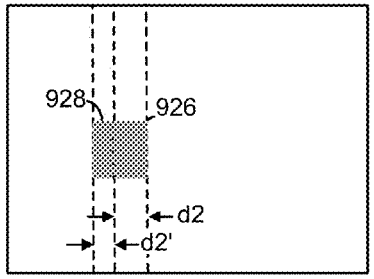
Fig. 9E2
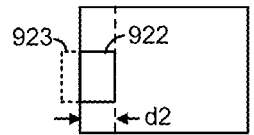
Fig. 9E3
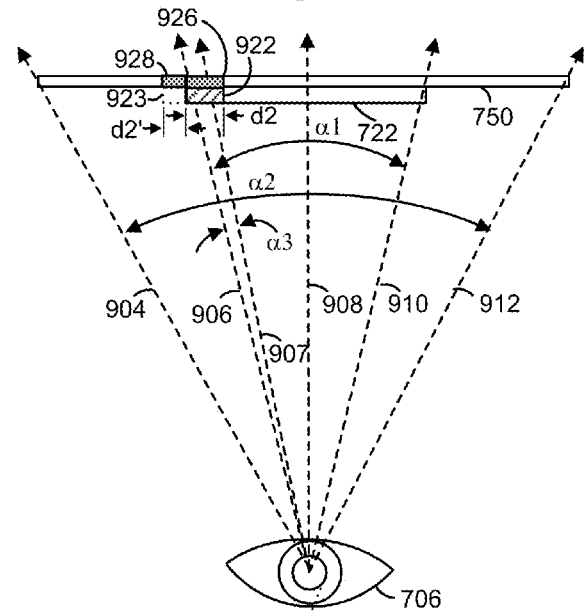
Fig. 9E1

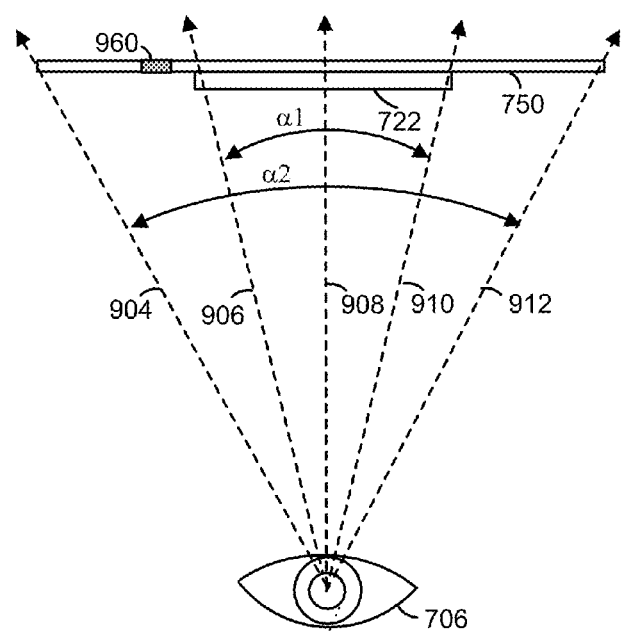
Fig. 9F1
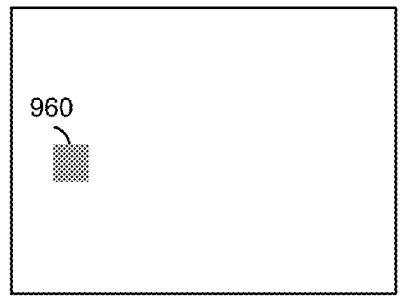
Fig. 9F2
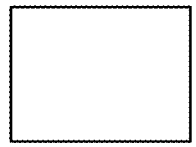
Fig. 9F3

OPACITY FILTER FOR DISPLAY DEVICE

CLAIM OF PRIORITY

This application is a divisional application of U.S. patent application Ser. No. 12/887,426, entitled "OPACITY FILTER FOR DISPLAY DEVICE," filed Sep. 21, 2010, published as US 2012/0068913 on Mar. 22, 2012 and issued as U.S. Pat. No. 8,941,559 on Jan. 27, 2015, and incorporated herein by reference in its entirety.

BACKGROUND

Head-mounted displays can be used in various application, including military, aviation, medicine, video gaming, entertainment, sports, and so forth. See-through head-mounted displays allow the user to observe the physical world around him or her, while optical elements add light from one or two small micro-displays into the user's visual path, to provide an augmented reality image. The augmented reality image may relate to a real-world scene which represents an environment in which a user is located. However, various challenges exist in providing an augmented reality image which is realistic and which can represent a full range of colors and intensities.

SUMMARY

An optical see-through head-mounted display device is provided. The head-mounted display device uses an opacity filter to selectively remove light from a real-world scene which reaches a user's eye. For example, the filter may block light based on a shape of an augmented reality image to avoid the augmented reality image being transparent. Further, an eye tracking component may be used to adjust a position of the augmented reality image and increased-opacity pixels of the opacity filter.

In one embodiment, an optical see-through head-mounted display (HMD) device includes a see-through lens extending between a user's eye and a real-world scene when the display device is worn by the user. The see-through lens has an opacity filter with a grid of pixels which can be controlled to adjust their opacity, from a minimum opacity level which allows a substantial amount of light to pass, to a maximum opacity level which allows little or no light to pass. The see-through lens also has a display component. The device further includes at least one augmented reality emitter, such as a micro-display, which emits light to the user's eye using the display component, where the light represents an augmented reality image having a shape. The device further includes at least one control which controls the opacity filter to provide an increased opacity for pixels which are behind the augmented reality image, from a perspective of the user's eye. The increased-opacity pixels are provided according to the shape of the augmented reality image.

An eye tracking component can be provided to track a location of the user's eye relative to a frame, so that the position of the increased-opacity pixels and/or the augmented reality image can be adjusted when there is movement of a frame on which the HMD device is carried. In this way, the identified pixels and the augmented reality image can be shifted based on movement of the frame, while their registration to one another is maintained.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 3A depicts a process for providing an augmented reality image in the HMD device of FIG. 1.

FIG. 3B depicts details of step 306 of FIG. 3A.

FIG. 4A depicts an example configuration of an opacity filter based on a shape of the augmented reality image of 104 of FIG. 1 or FIG. 4C.

FIG. 4B depicts the example real-world scene 120 of FIG. 1.

FIG. 4C depicts the example augmented reality image 104 of FIG. 1.

FIG. 4D depicts the example image 132 of FIG. 1 which is seen by a user.

FIG. 8A1 depicts a registration of a real-world image and an increased-opacity region of an opacity filter when the user's eye is in a first location relative to a frame of the HMD device.

FIG. 8A2 depicts a front-facing view of the real-world scene element 800 of FIG. 8A1.

FIG. 8A3 depicts a front-facing view of the opacity filter region 804 of FIG. 8A1.

FIG. 8A4 depicts a front-facing view of the augmented reality image region 805 of FIG. 8A1.

FIG. 8B1 depicts a registration of a real-world image and an increased-opacity region of an opacity filter when the user's eye is in a second location relative to a frame of the HMD device.

FIG. 8B2 depicts a front-facing view of the real-world scene element 800 of FIG. 8B1.

FIG. 8B3 depicts a front-facing view of the opacity filter region 806 of FIG. 8B1.

FIG. 8B4 depicts a front-facing view of the augmented reality image region 807 of FIG. 8B1.

FIG. 9A1 depicts a registration of an augmented reality image and an increased-opacity region of an opacity filter, at a center of an augmented reality display region of a field of view of a user's eye.

FIG. 9A2 depicts a front-facing view of the opacity filter region 902 of FIG. 9A1.

FIG. 9A3 depicts a front-facing view of the augmented reality image region 900 of FIG. 9A1.

FIG. 9B1 depicts a registration of an augmented reality image and an increased-opacity region of an opacity filter, at a peripheral boundary of the augmented reality display region of FIG. 9A1.

FIG. 9B2 depicts a front-facing view of the opacity filter region 920 of FIG. 9B1.

FIG. 9B3 depicts a front-facing view of the augmented reality image region 922 of FIG. 9B1.

FIG. 9C1 depicts a gradual change in opacity as a function of a distance from a peripheral boundary of a field of view of a user's eye.

FIG. 9C2 depicts an opacity filter region with a non-faded portion 931 and successively faded portions 932, 933 and 934, with fading between 0 and d1 in FIG. 9C1.

FIG. 9C3 depicts an opacity filter region with a non-faded portion 941 and successively faded portions 942, 943 and 944, with fading between 0 and d3 in FIG. 9C1.

FIG. 9C4 depicts an opacity filter region with a non-faded portion 951 and successively faded portions 952, 952 and 953, with fading between d4 and d5 in FIG. 9C1.

FIG. 9D1 depicts a registration of an augmented reality image and an increased-opacity region of an opacity filter, at a peripheral boundary of the augmented reality display region of FIG. 9A1, where an additional region of increased opacity is provided in a second, peripheral region of the field of view.

FIG. 9D2 depicts a front-facing view of the opacity filter regions 920 and 924 of FIG. 9D1.

FIG. 9D3 depicts a front-facing view of the augmented reality image region 900 of FIG. 9D1.

FIG. 9E1 depicts a registration of a first portion of an augmented reality image and an increased-opacity region of an opacity filter, at a peripheral boundary of the augmented reality display region of FIG. 9A1, where an additional region of increased opacity is provided in a second, peripheral region of the field of view to represent a second, cutoff portion of the augmented reality image.

FIG. 9E2 depicts a front-facing view of the opacity filter regions 926 and 928 of FIG. 9E1.

FIG. 9E3 depicts a front-facing view of the augmented reality image regions 922 and 923 of FIG. 9E1.

FIG. 9F1 depicts an increased-opacity region of an opacity filter in a second, peripheral region of a field of view, at a time when no augmented reality image is provided.

FIG. 9F2 depicts a front-facing view of the opacity filter region 960 of FIG. 9F1.

FIG. 9F3 depicts a front-facing view of the augmented reality image of FIG. 9F1.

DETAILED DESCRIPTION

See-through head-mounted displays (HMDs) most often use optical elements such as mirrors, prisms, and holographic lenses to add light from one or two small micro-displays into the user's visual path. By their very nature, these elements can only add light, but cannot remove light. This means a virtual display cannot display darker colors—they tend towards transparent in the case of pure black—and virtual objects such as augmented reality images, seem translucent or ghosted. For compelling augmented reality or other mixed reality scenarios, it is desirable to have the ability to selectively remove natural light from the view so that virtual color imagery can both represent the full range of colors and intensities, while making that imagery seem more solid or real. To achieve this goal, a lens of a HMD device can be provided with an opacity filter which can be controlled to selectively transmit or block light on a per-pixel basis. Control algorithms can be used to drive the intensity and/or color of the opacity filter based on the augmented reality image. The opacity filter can be placed physically behind an optical display component which introduces the augmented reality image to the user's eye. Additional advantages can be obtained by having the opacity filter extend beyond a field of view of the augmented reality image to provide peripheral cues to the user. Moreover, peripheral cues, or a representation of the augmented reality image, can be provided by the opacity filter even in the absence of an augmented reality image.

Figure 1:
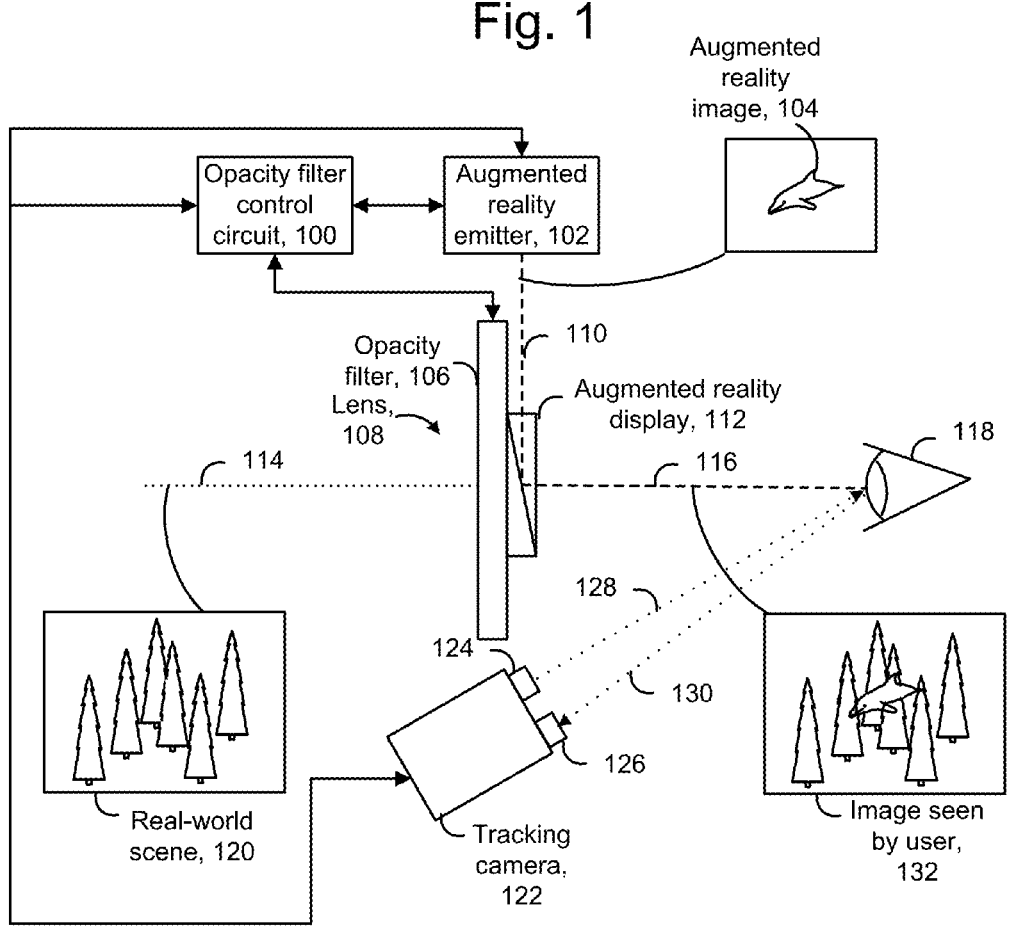
FIG. 1 depicts an example embodiment of an optical see-through HMD device with an augmented reality capability.

FIG. 1 depicts an example embodiment of an optical see-through HMD device with an augmented reality capability. The display device can include a see-through lens 108 which is placed in front of a user's eye, similar to an eyeglass lens. Typically, a pair of see-through lenses are provided, one for each eye. The lens includes an opacity filter 106 and an optical display component 112 such as a beam splitter, e.g., a half-silvered mirror or other light-transmissive mirror. Light from a real world scene 120, such as a light ray 114, reaches the lens and is selectively passed or blocked by the opacity filter 106. The light from the real world scene which passes through the opacity filter also passes through the display component.

The opacity filter is under the control of an opacity filter control circuit 100. Meanwhile, an augmented reality emitter 102 emits a 2-D array of light representing an augmented reality image 104 and exemplified by a light ray 110. Additional optics are typically used to refocus the augmented reality image so that it appears to originate from several feet away from the eye rather than from about one inch away, where the display component actually is.

The augmented reality image is reflected by the display component 112 toward a user's eye 118, as exemplified by a light ray 116, so that the user sees an image 132. In the image 132, a portion of the real-world scene 120, such as a grove of trees, is visible, along with the entire augmented reality image 104, such as a flying dolphin. The user therefore sees a fanciful image in which a dolphin flies past trees, in this entertainment-oriented example. In an advertising oriented example, the augmented reality image can appear as a can of soda on a user's desk. Many other applications are possible. Generally, the user can wear the HMD device anywhere, including indoors or outdoors. Various pieces of information can be obtained to determine what type of augmented reality image is appropriate and where it should be provided on the display component. For example, the location of the user, the direction in which the user is looking, and the location of floors, walls and perhaps furniture, when the user is indoors, can be used to decide where to place the augmented reality image in an appropriate location in the real world scene.

The direction in which the user is looking can be determined by tracking a position of the user's head using a combination of motion tracking techniques and an inertial measure unit which is attached to the user's head, such as via the augmented reality glasses. Motion tracking techniques use a depth sensing camera to obtain a 3D model of the user. A depth sensing camera can similarly be used to obtain the location of floors, walls and other aspects of the user's environment. See, e.g., US 2010/0197399, published Aug. 5, 2010, titled "Visual Target Tracking," US 2010/0194872, published Aug. 5, 2010, titled "Body Scan," and U.S. Pat. No. 7,515,173, issued Apr. 7, 2009, titled "Head Pose Tracking System," each of which is incorporated herein by reference.

A portion of the real-world scene which is behind the augmented reality image, from a perspective of the user's eye, is blocked by the opacity filter from reaching the user's eye, so that the augmented reality image appears clearly to the user. The augmented reality image may be considered to provide a primary display, while the opacity filter provides a secondary display. The intensity and/or color of the secondary display can be driven to closely match the imagery on the primary display, enhancing the ability of the primary display to resemble natural light.

A tracking camera 122 can be used to identify a location of the user's eye with respect to a frame on which the HMD device is mounted. The frame can be similar to conventional eyeglass frames, in one approach. See, e.g., FIGS. 7A and 7B for an example of a frame. Typically, such a frame can move slightly on the user's head when worn, e.g., due to motions of the user, slipping of the bridge of the frame on the user's nose, and so forth. See FIGS. 8A1-8B4 for further details. By providing real-time information regarding the location of the eye with respect to the frame, the controller can control the opacity filter, and the augmented reality emitter can adjust its image, accordingly. For example, the augmented reality image can be made to appear more stable, while a registration or alignment of increased-opacity pixels of the opacity filter and the augmented reality image is maintained. In an example approach, the tracking camera 122 includes an infrared (IR) emitter 124 which emits IR light 128 toward the eye 118, and an IR sensor 126 which senses reflected IR light 130. The position of the pupil can be identified by known imaging techniques such as detecting the reflection of the cornea. For example, see U.S. Pat. No. 7,401,920, titled "Head mounted eye tracking and display system" issued Jul. 22, 2008 to Ophir et al., incorporated herein by reference. Such techniques can locate a position of the center of the eye relative to the tracking camera. Generally, eye tracking involves obtaining an image of the eye and using computer vision techniques to determine the location of the pupil within the eye socket. Other eye tracking technique can use arrays of photo detectors and LEDs. With a known mounting location of the tracking camera on the frame, the location of the eye with respect to any other location which is fixed relative to the frame, such as the opacity filter 106 and the optical component 112, can be determined. Typically it is sufficient to track the location of one of the user's eyes since the eyes move in unison. However, it is also possible to track each eye separately and use the location of each eye to determine the location of the augmented reality image for the associated see-through lens.

In the example depicted, the tracking camera images the eye from a side position on the frame that is independent from the opacity filter and optical component 112. However, other approaches are possible. For example, light used by the tracking camera could be carried via the optical component 112 or otherwise integrated into the lens.

The opacity filter can be a see-through LCD panel, electrochromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

The opacity filter can be placed over or inside the lens. The lens may also include glass, plastic or other light-transmissive material. The opacity filter can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 80 or 90% per pixel, up to the resolution of the LCD. At the minimum of 50%, the lens will have a slightly tinted appearance, which is tolerable. 100% transmissivity represents a perfectly clear lens. We can define an "alpha" scale from 0-100% where 0% is the highest transmissivity (least opaque) and 100% is the lowest transmissivity (most opaque). The value "alpha" can be set for each pixel by the opacity filter control circuit.

A mask of alpha values can be used from a rendering pipeline, after z-buffering with proxies for real-world objects. When we render a scene for the augmented reality display, we want to take note of which real-world objects are in front of which augmented reality objects. If an augmented reality object is in front of a real-world object, then the opacity should be on for the coverage area of the augmented reality object. If the augmented reality object is (virtually) behind a real-world object, then the opacity should be off, as well as any color for that pixel, so the user will only see the real-world object for that corresponding area (a pixel or more in size) of real light. Coverage would be on a pixel-by-pixel basis, so we could handle the case of part of an augmented reality object being in front of a real-world object, part of an augmented reality object being behind a real-world object, and part of an augmented reality object being coincident with a real-world object.

Additional enhancements come in the form of new display types repurposed to use as opacity filters. Displays capable of going from 0% to 100% opacity at low cost, power, and weight are the most desirable for this use. Moreover, the opacity filter can be rendered in color, such as with a color LCD or with other displays such as organic LEDs, to provide a wide field of view surrounding the optical component 112 which provides the augmented reality image.

The opacity filter control circuit 100 can be a micro-processor, for instance. The opacity filter control circuit 100 and the augmented reality emitter 102 may communicate with the tracking camera 122. In one option, a central control (not shown) communicates with the tracking camera 122, and is used to oversee the opacity filter control circuit 100 and the augmented reality emitter 102. Appropriate wired or wireless communication paths between the components 100, 102 and 122 can be provided and integrated into the frame of the HMD device.

The resulting HMD device is relatively streamlined, compared to devices such as conventional LCD shutter glasses for active stereo 3D viewing, which typically require complex optics. These are glasses used in conjunction with a display screen to create the illusion of a 3D image. In the eyeglass lens, a liquid crystal layer can switch from being transparent to being opaque when a voltage is applied, so that effectively one pixel per eye is provided. The glasses can be controlled by a wireless signal in synchronization with the refresh rate of the screen. The screen alternately displays different perspectives for each eye, which achieves the desired effect of each eye seeing only the image intended for it. The HMD device provided herein has the ability to operate as shutter glasses by controlling all pixels of the opacity filter together to be transparent or opaque.

In another alternative, the HMD device can provide passive stereoscopic vision. Since the filters used in LCD panels are polarized, we can orient the LCD panels of the right and left lenses so that the polarization is different by 90 degrees. This changes the behavior of the rotated LCD so that transmissivity and opacity are reversed. A voltage applied results in transmissivity and no voltage applied results in opacity. For the non-rotated LCD, a voltage applied results in opacity and no voltage applied results in transmissivity.

An opacity filter such as an LCD has generally not been used in a see-through lens as described herein because at this near distance to the eye, it is almost completely out of focus.

However, this result is actually desirable for our purposes. A user sees the augmented reality image with crisp color graphics via the normal HMD display using additive color, which is designed to be in focus. The LCD panel is placed "behind" this display such that a fuzzy black border surrounds any virtual content, making it as opaque as desired. We convert the flaw of natural blurring to expediently obtain the feature of anti-aliasing and bandwidth reduction. These are a natural result of using a lower-resolution and out-of-focus image. There is an effective smoothing of the digitally-sampled image. Any digital image is subject to aliasing, where the discrete nature of the sampling causes errors against the naturally analog and continuous signal, around the wavelengths of light. Smoothing means visually closer to the ideal analog signal. Although information lost to the low resolution is not recovered, the resulting errors are less noticeable.

We optimize graphics rendering such that the color display and the opacity filter are rendered simultaneously and are calibrated to a user's precise position in space to compensate for angle-offset issues. Eye tracking can be employed to compute the correct image offset at the extremities of the viewing field. The opacity filter or mask can furthermore be enlarged to cover the entire lens of the HMD device, extending beyond the display component of the augmented reality image in a central field of view. The opacity mask can also be rendered in color, either with a color LCD, or with other displays such as an organic LED (OLED), to provide a wide field of view surrounding the high-resolution focal area in the central field of view.

Figure 2:
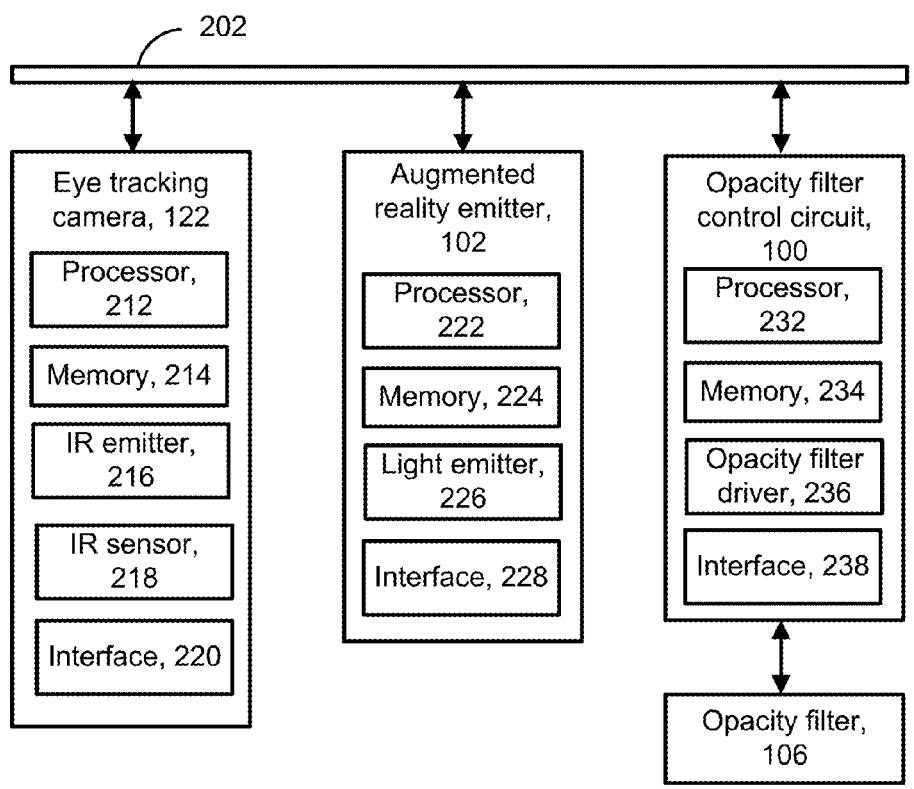
FIG. 2 depicts a system diagram of the HMD device of FIG. 1.

FIG. 2 depicts a system diagram of the HMD device of FIG. 1. The system includes the eye tracking camera 122, the augmented reality emitter 102 and the opacity filter control circuit 100, which can communicate with one another via a bus 202 or other communication paths. The eye tracking camera 122 includes a processor 212, a memory 214, an IR emitter 216, an IR sensor 218 and an interface 220. The memory 214 can contain instructions which are executed by the processor 212 to enable the eye tracking camera to perform its functions as described herein. The interface allows the eye tracking camera to communicate data to the augmented reality emitter and the opacity filter control circuit, which indicates the relative location of the user's eye with respect to the frame. The opacity filter control circuit can use the data to provide a corresponding offset to the pixels which have an increased opacity in the opacity filter. Similarly, the augmented reality emitter can use the data to provide a corresponding offset to the pixels which are used to emit the augmented reality image.

In another approach, it is sufficient for the eye tracking camera to communicate the eye location data to the augmented reality emitter, in which case the augmented reality emitter provides data to the opacity filter control circuit to indicate which pixels of the opacity filter should have an increased opacity. Or, the eye tracking camera can communicate the eye location data to the opacity filter control circuit which relays the data to the augmented reality emitter. In another possibility, the opacity filter control circuit but not the augmented reality emitter uses the eye location data, since changes in the pixels of the opacity filter are more noticeable than changes in the augmented reality image, due to the closeness of the opacity filter to the eye.

In any case, the augmented reality emitter can provide data to the opacity filter control circuit which indicates a shape of the augmented reality image. The shape can be defined by a perimeter and the enclosed points. This data can be also used by the opacity filter control circuit to decide which pixels of the opacity filter should be provided with an increased opacity, usually in correspondence with the size and shape of the augmented reality image.

The augmented reality emitter includes a processor 222, a memory 224, a light emitter which emits visible light and an interface 228. The memory 224 can contain instructions which are executed by the processor 222 to enable the augmented reality emitter to perform its functions as described herein. The light emitter can be a micro-display such as an LCD which emits a 2D color image in a small area such as one quarter inch square. The interface may be used to communicate with the eye tracking camera and/or the opacity filter control circuit.

The opacity filter control circuit 100 includes a processor 232, a memory 234, an opacity filter driver 236 and an interface 228. The memory 234 can contain instructions which are executed by the processor 232 to enable the opacity filter control circuit to perform its functions as described herein. The opacity filter driver can drive pixels in the opacity filter 106 such as by addressing each pixel by a row and column address and a voltage which indicates a desired degree of opacity, from a minimum level which is most light-transmissive level to a maximum level which is most opaque or least light-transmissive. In some cases, a color of each pixel is set. The interface may be used to communicate with the eye tracking camera and/or the augmented reality emitter. The opacity filter control circuit communicates with the opacity filter 106 to drive its pixels.

One of more of the processors 212, 222 and 232 can be considered to be control circuits. Moreover, one or more of the memories 214, 224 and 234 can be considered to be a tangible computer readable storage having computer readable software embodied thereon for programming at least one processor or control circuit to perform a method for use in an optical see-through HMD device as described herein.

The system may further components, discussed previously, such as for determining a direction in which the user is looking, the location of floors, walls and other aspects of the user's environment.

FIG. 3A depicts a process for providing an augmented reality image in the HMD device of FIG. 1. At step 300, the eye tracking component provides data regarding the relative location of the eye. Generally, this can be performed several times per second. The data can indicate an offset of the eye from a default location, such as when the eye is looking straight ahead. At step 302, the augmented reality emitter provides data regarding size, shape and location (and optionally color) of an augmented reality image to the opacity filter control circuit. The location data can be based on the data regarding the relative location of the eye. The augmented reality image is an image which is set based on the needs of an application in which it is used. For instance, the previous example of a flying dolphin is provided for an entertainment application. At step 304, the augmented reality emitter emits the augmented reality image, so that it reaches the user's eye via one or more optical components. Concurrently, at step 306, the opacity filter control circuit drives pixels of the opacity filter, to provide an increased opacity behind the augmented reality image. At decision step 310, if there is a next augmented reality image, the process is repeated starting at step 300. If there is no next augmented reality image, the process ends at step 312.

The next augmented reality image can refer to the same augmented reality image as previously provided, but in a different location, as seen by the user, such as when the previous augmented reality image is moved to a slightly different location to depict movement of the augmented reality image. The next augmented reality image can also refer to a new type of image, such as switching from a dolphin to another type of object. The next augmented reality image can also refer to adding a new object while a previously displayed object continues to be displayed. In one approach, the augmented reality emitter emits video images at a fixed frame rate. In another approach, static images are emitted and persisted for a period of time which is greater than a typical video frame period.

Step 314 optionally provides a gradual fade in the augmented reality image, such as when it is near a boundary of an augmented reality display region of a field of view. The augmented reality display region can be defined by the maximum angular extent (vertically and horizontally) in the user's field of view in which the augmented reality image is constrained, due to limitations of the augmented reality emitter and/or optical components 112. Thus, the augmented reality image can appear in any portion of the augmented reality display region, but not outside the augmented reality display region.

Generally, a temporal or spatial fade in the amount of opacity can be used in the opacity filter. Similarly, a temporal or spatial fade in the augmented reality image can be used. In one approach, a temporal fade in the amount of opacity of the opacity filter corresponds to a temporal fade in the augmented reality image. In another approach, a spatial fade in the amount of opacity of the opacity filter corresponds to a spatial fade in the augmented reality image. The boundary can be a boundary of the augmented reality display region. The boundary can be peripheral, e.g., extending in the horizontal direction, or vertical. Fading is discussed further, e.g., in connection with FIG. 9C.

FIG. 3B depicts details of step 306 of FIG. 3A. In step 320, the opacity filter control circuit identifies pixels of the opacity filter which are behind the augmented reality image, e.g., based on the size, shape and location of the augmented reality image. A variety of approaches are possible. In one approach, at step 322, an increased opacity is provided for the pixels of the opacity filter which are behind the augmented reality image, from the perspective of the identified location of the user's eye. In this manner, the pixels behind the augmented reality image are darkened so that light from a corresponding portion of the real world scene is blocked from reaching the user's eyes. This allows the augmented reality image to be realistic and represent a full range of colors and intensities. Moreover, power consumption by the augmented reality emitter is reduced since the augmented reality image can be provided at a lower intensity. Without the opacity filter, the augmented reality image would need to be provided at a sufficiently high intensity which is brighter than the corresponding portion of the real world scene, for the augmented reality image to be distinct and not transparent. In darkening the pixels of the opacity filter, generally, the pixels which follow the closed perimeter of augmented reality image are darkened, along with pixels within the perimeter. See, e.g., FIGS. 4D and 5. It can be desirable to provide some overlap so that some pixels which are outside the perimeter and surround the perimeter are also darkened. See region 404 in FIG. 4D. These overlapping pixels can provide a darkened region have a uniform thickness around the perimeter. In another approach, interesting effects can be achieved, e.g., by darkening all or most of the pixels of the opacity filter which are outside the perimeter of the augmented reality image, while allowing the pixels within the perimeter of the augmented reality image to remain light-transmissive.

Step 324 provides an increased opacity for pixels of the opacity filter which are outside an augmented reality display region of a field of view. Generally, the field of view of a user is the angular extent of the observable world, vertically and horizontally, that is seen at any given moment. Humans have an almost 180-degree forward-facing field of view. However, the ability to perceive color is greater in the center of the field of view, while the ability to perceive shapes and motion is greater in the periphery of the field of view. Furthermore, as mentioned, the augmented reality image is constrained to being provided in a subset region of the user's field of view. In an example implementation, the augmented reality image is provided in the center of the field of view over an angular extent of about 20 degrees, which lines up with the fovea of the eye. This is the augmented reality display region of the field of view. See, e.g., FIGS. 9A1 and 9B1 (region defined by $\alpha 1$) for further details. The augmented reality image is constrained by factors such as the size of the optical components used to route the augmented reality image to the user's eye.

On the other hand, due to its incorporation into the lens, the opacity filter can extend in a larger range of the field of view, such as about 60 degrees, as well as including the first field of view. See, e.g., FIGS. 9A1 and 9B1 (region defined by $\alpha 2$) for further details. Pixels of the opacity filter which are outside the first field of view in the peripheral direction, for instance, can be provided with an increased opacity in correspondence with an increased opacity for pixels of the opacity filter which are inside the first field of view. See, e.g., FIGS. 9D1-D3 for further details. This can be useful, e.g., in providing a peripheral cue which accentuates movement of the augmented reality image, for instance. For example, the peripheral cue may appear as a shadow of the augmented reality image. The peripheral cue may or may not be in a region of peripheral vision of the user. The peripheral cue can enhance a sense of movement or otherwise capture the user's attention.

Further, when the augmented reality image is near a boundary of the augmented reality display region of the field of view, corresponding pixels of the opacity filter which are outside the field of view can be provided with an increased opacity uniformly, or in a spatial fade. For example, the increased-opacity pixels can be adjacent to the augmented reality image at the boundary. The augmented reality image can be a first portion of an image, where a second portion of the image is cutoff at the boundary, so that it is not displayed, in which case the increased-opacity pixels can represent the second portion of the image, having a similar size and shape as the second portion of the image. See, e.g., FIGS. 9E1-9E3 for further details. In some cases, the increased-opacity pixels can have a similar color as the second portion of the image.

Even if the augmented reality image is not cutoff at the boundary, the increased-opacity pixels can be provided to represent a transition from the augmented reality image to the real world scene. In one approach, the increased-opacity pixels are faded so that the pixels of the opacity filter which are closer to the augmented reality image at the boundary are more opaque, and the pixels of the opacity filter which are further from the augmented reality image at the boundary are more light-transmissive.

Another option involves providing an increased-opacity for pixels of the opacity filter at a time when an augmented reality image is not present, such as to provide a peripheral or non-peripheral cue. Such a cue might be useful in an application in which there is motion in the real-world scene, for instance. Or, the increased-opacity pixels of the opacity filter can provide a representation of the augmented reality image in a peripheral region of the field of view. See, e.g., FIGS. 9F1-9F3 for further details.

Step 326 provides a gradual transition in opacity, e.g., a spatial fade, when the augmented reality image is near a boundary of the augmented reality display region of the field of view. To avoid an abrupt transition in the augmented reality image, a spatial fade in the augmented reality image can occur such as described in step 314. A corresponding fade can occur in the pixels of the opacity filter. For example, the augmented reality image can become more faded, and the pixels of the opacity filter can become less opaque, for portions of the augmented reality image which are closer to the boundary than for portions of the augmented reality image which are further from the boundary. A gradual transition in opacity can similarly be provided even if the augmented reality image is not near a boundary of the augmented reality display region of the field of view.

FIG. 4A depicts an example configuration of an opacity filter 400 based on a shape of the augmented reality image of FIG. 4C. The opacity filter provides a region 402 of increased opacity. An increased opacity generally refers to a darkening of pixels which can include a darkening to different grey levels in a monochrome scheme, or a darkening to different color levels in a color scheme.

FIG. 4B depicts the example real-world scene 120 of FIG. 1. When light from the real-world scene 120 passes through the opacity filter, the light is multiplied by the opacity filter 400 such that increased-opacity area multiplies the corresponding area of the real-world scene by a "0," so that the corresponding area of the real-world scene is not transmitted through the opacity filter, while the non-darkened area multiplies the corresponding area of the real-world scene by a "1," so that the corresponding area of the real-world scene is transmitted through the opacity filter.

FIG. 4C depicts the example augmented reality image 104 of FIG. 1. The augmented reality image 104 can be rendered with colors and textures which are not depicted in this example.

FIG. 4D depicts the example image 132 of FIG. 1 which is seen by a user. The image 132 is formed by adding the image 104 to an image which is formed by multiplying the images 402 and 120. A darkened region 404 surrounds the augmented reality image of a dolphin.

Figure 5:
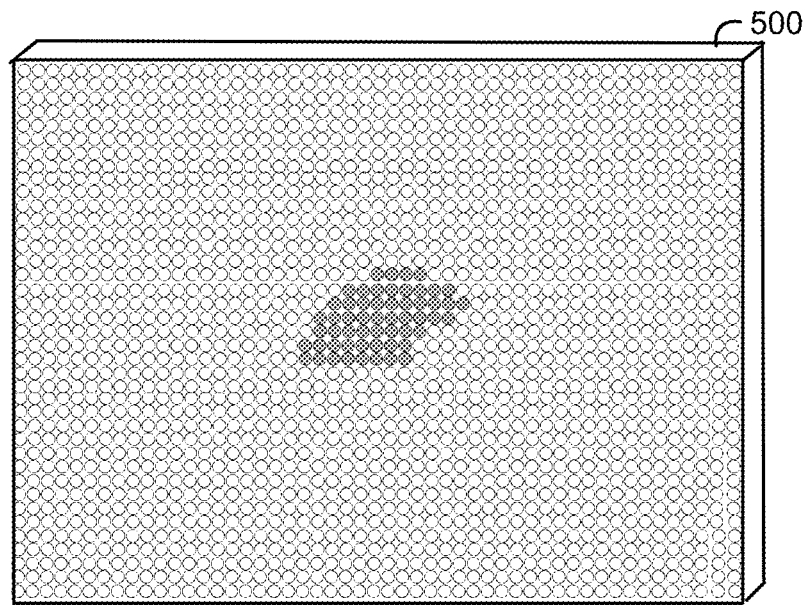
FIG. 5 depicts an opacity filter with increased-opacity regions, to provide the configuration of the opacity filter of FIG. 4A.

FIG. 5 depicts an opacity filter 500 with increased-opacity regions, to provide the configuration of the opacity filter of FIG. 4A. Each small circle represents a pixel of the opacity filter. Selected pixels which correspond to the size, shape and location of the augmented reality image are controlled to have an increased opacity. An outline of the augmented reality image is superimposed for reference.

Figure 6:
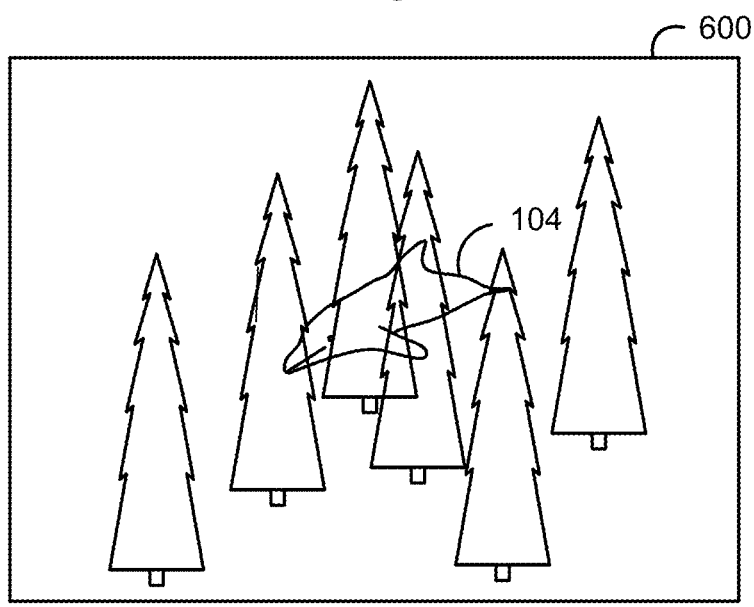
FIG. 6 depicts a variation of the example image of FIG. 1 which would result without the opacity filter.

FIG. 6 depicts a variation of the example image of FIG. 1 which would result without the opacity filter. In this image 600, the augmented reality image 104 appears to be transparent or ghosted, so that the real-world scene is visible behind the augmented reality image. This result is less realistic.

Figure 7A:
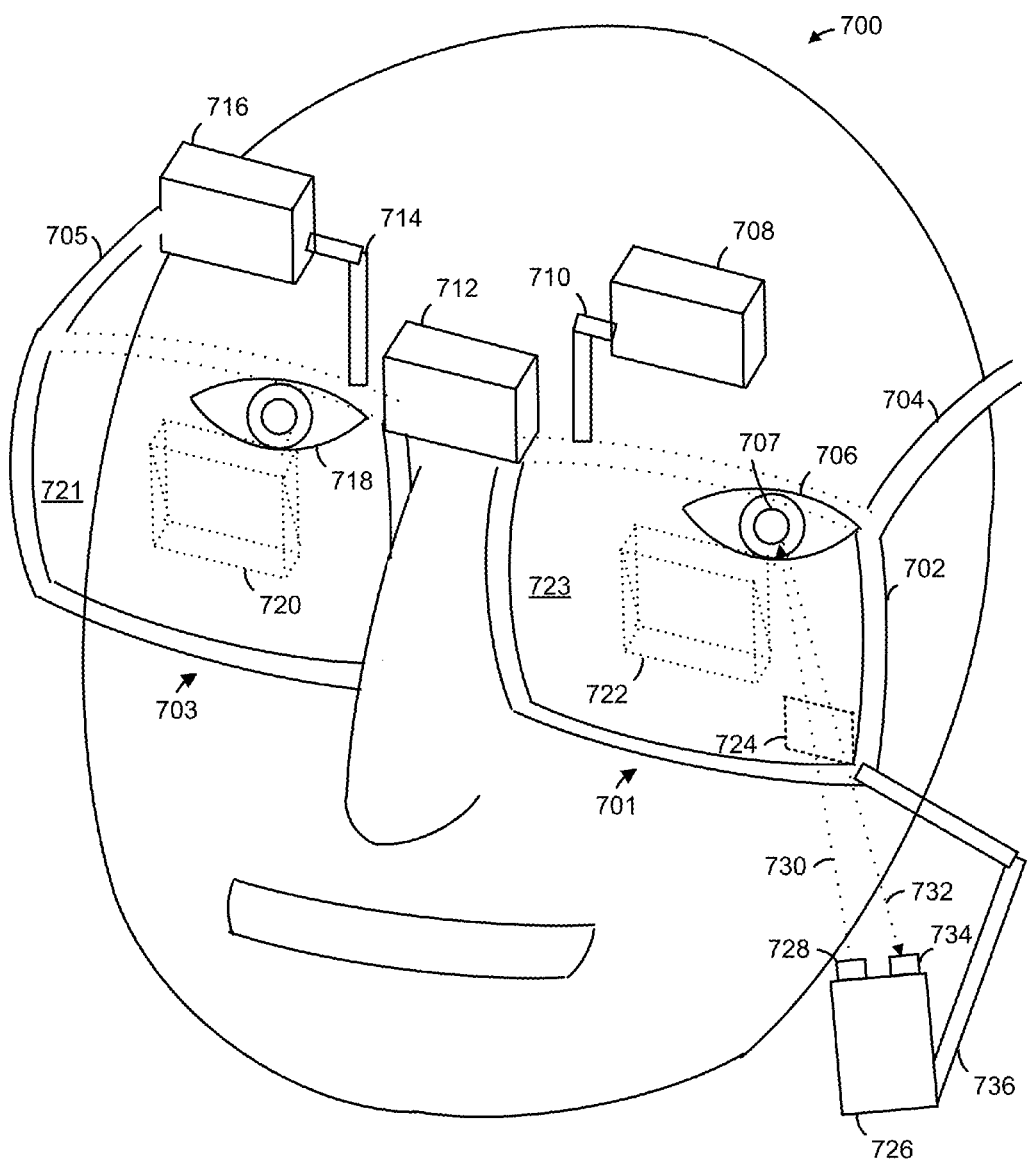
FIG. 7A depicts an example implementation of the display device of FIG. 1, as worn on a user's head.

FIG. 7A depicts an example implementation of the display device of FIG. 1, as worn on a user's head 700. In this example, the frame is similar to a conventional eyeglasses frame and can be worn with a similar comfort level. However, other implementations are possible, such as a face shield which is mounted to the user's head by a helmet, strap or other means. The frame includes a frame front 702 and temples 704 and 705. The frame front holds a see-through lens 701 for the user's left eye and a see-through lens 703 for the user's right eye. The left and right orientations are from the user's perspective. The left-side see-through lens 701 includes a light-transmissive opacity filter 723 and a light-transmissive optical component 722 such as a beam splitter which mixes an augmented reality image with light from the real-world scene for viewing by the left eye 706. An opening 724 in the opacity filter can be provided to allow an eye tracking component 726 to image the left eye 706, including the pupil 707. The opening can be, e.g., a hole in the lens 701, or a region of the lens 701 in which the opacity filter is not provided. The opacity filter can be provided in or on another light-transmissive lens material such as glass or plastic, as mentioned. Infrared light used by the eye tracking component 726 can pass through such a light-transmissive lens material.

The eye tracking component 726 includes an IR emitter 728 which emits IR light 730 and an IR sensor 734 which senses reflected IR light 732. The eye tracking component 726 can be mounted to the frame via an arm 736, in one possible approach.

The right-side see-through lens 701 includes a light-transmissive opacity filter 721 and an optical component 720 such as a beam splitter which mixes an augmented reality image with light from the real-world scene for viewing by the right eye 718. A right-side augmented reality emitter 716 is mounted to the frame via an arm 714, and a left-side augmented reality emitter 708 is mounted to the frame via an arm 710. An opacity filter control circuit 712 can be mounted to the bridge of the frame, and shared by the left- and right-side opacity filters. Appropriate electrical connections can be made via conductive paths in the frame, for instance.

Figure 7B:
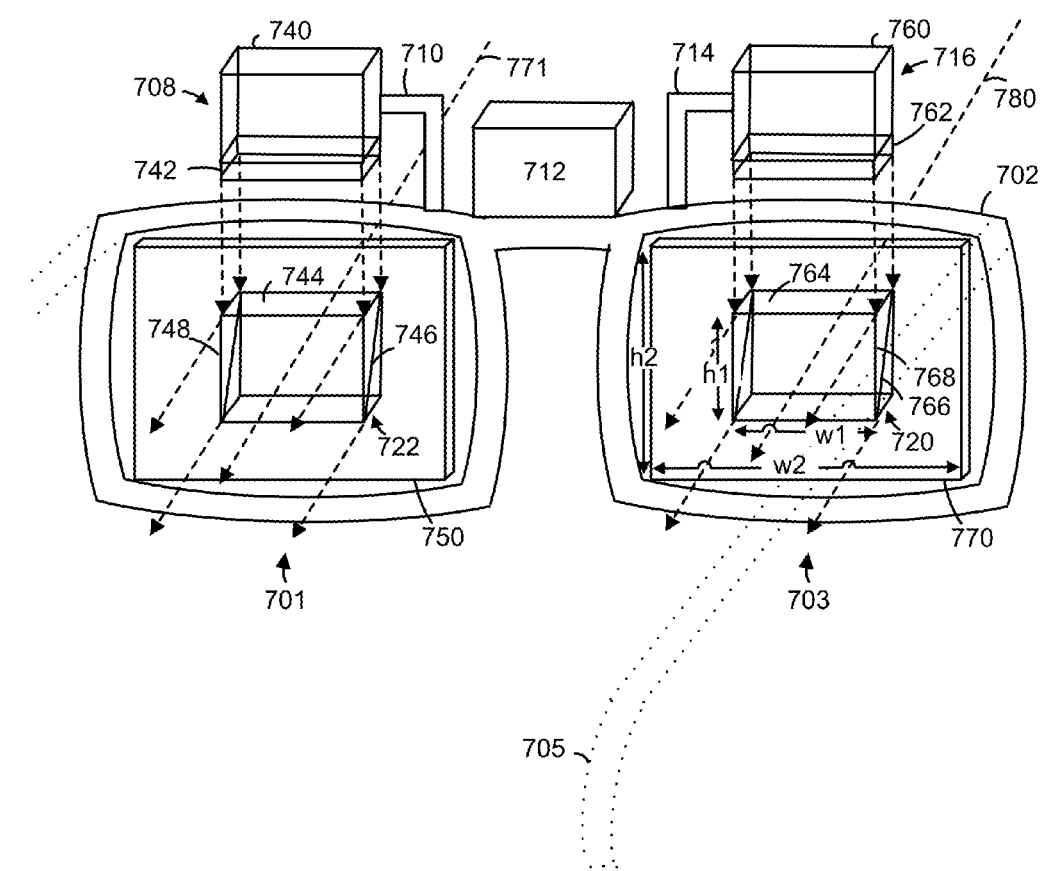
FIG. 7B depicts further details of the HMD device of FIG. 7A.

FIG. 7B depicts further details of the HMD device of FIG. 7A. The display device is shown from a perspective of the user looking forward, so that the right-side lens 703 and the left-side lens 701 are depicted. The right-side augmented reality emitter 716 includes a light-emitting portion 762 such as a grid of pixels, and a portion 760 which may include circuitry for controlling the light-emitting portion 762. Similarly, the left-side augmented reality emitter 708 includes a light-emitting portion 742 and a portion 740 with circuitry for controlling the light-emitting portion 742. Each of the optical components 720 and 722 may have the same dimensions, in one approach, including a width w1 and a height h1. The right-side optical component 720 includes a top surface 764 through which light enters from the right-side augmented reality emitter 716, an angled half-mirrored surface 766 within the optical component 720, and a face 768. Light from the right-side augmented reality emitter 716 and from portions of the real-world scene (represented by ray 780) which are not blocked by the opacity filter 770 pass through the face 768 and enter the user's right-side eye. Similarly, the left-side optical component 722 includes a top surface 744 through which light enters from the left-side augmented reality emitter 708, an angled half-mirrored surface 746 within the optical component 722, and a face 748. Light from the left-side augmented reality emitter 708 and from portions of the real-world scene (represented by ray 771) which are not blocked by the opacity filter 750 pass through the face 748 and enter the user's left-side eye. Each of the opacity filters 750 and 770 may have the same dimensions, in one approach, including a width w2>w1 and a height h2>h1.

Typically, the same augmented reality image is provided to both eyes, although it is possible to provide a separate image to each eye such as for a stereoscopic effect. In an alternative implementation, only one augmented reality emitter is routed by appropriate optical components to both eyes.

Figure 7C:
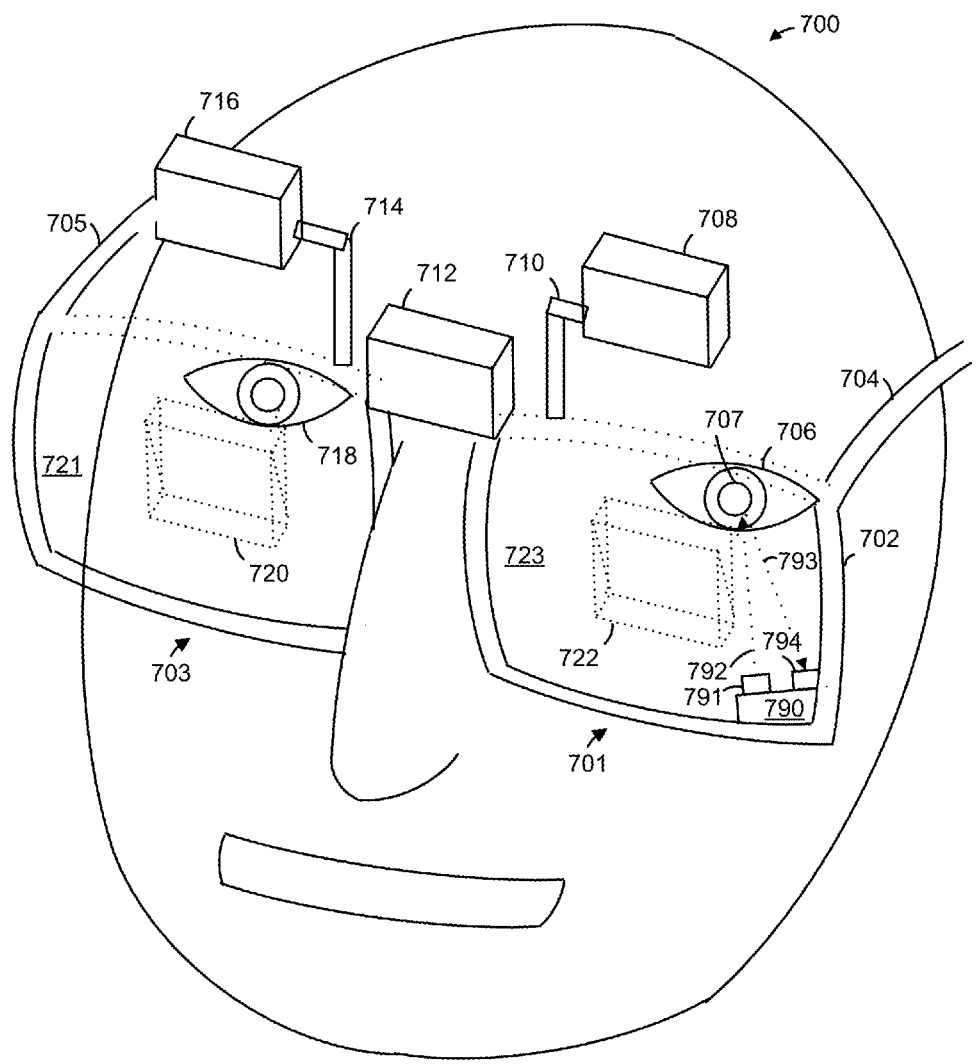
FIG. 7C depicts an alternative implementation of the display device of FIG. 1, as worn on a user's head, where the eye tracking component is directly on the front eye glass frame.

FIG. 7C depicts an alternative implementation of the display device of FIG. 1, as worn on a user's head, where the eye tracking component 790 is directly on, and inside, the front eye glass frame 702. In this implementation, the eye tracking component does not need to project through the lends 701. The eye tracking component 790 includes an IR emitter 791 which emits IR light 792 and an IR sensor 794 which senses reflected IR light 793.

Regarding eye tracking, in most cases, it is sufficient to know the displacement of the augmented reality glasses relative to the eyes as the glasses bounce around during motion. The rotation of the eyes (e.g., the movement of the pupil within the eye socket) is often less consequential. Although the alignment of the opacity region and the augmented reality image is a function of the eye position as well, in practice, we can align the left side of the opacity display as if the user was looking left, and the right side of the opacity display as the user was looking right at the same time by stretching the opacity image to match both criteria. If we do this, then eye angle can be ignored. A disadvantage to this approach is that the left side will be wrong when the user looks right, and the right side will be wrong when the user looks left, but the user will not notice, since the user can only visually measure the part that falls into the center of the user's field of view.

FIG. 8A1 depicts a registration of a real-world image and an increased-opacity region of an opacity filter when the user's eye is in a first location relative to a frame of the HMD device. A top view is depicted. As mentioned, an eye tracking component can be used to identify a location of the eye relative to the frame. In this example, a horizontal position of the frame relative to the eye 706 and its pupil 707 is considered. The opacity filter 750 and optical component 722 are mounted to the frame and therefore move with the frame. Here, the eye 706 is looking straight ahead at an element 800 of a real-world scene, as represented by a line of sight 802. The element 800 has a width xrw. The opacity filter 750 includes a region 804 with an increased opacity, while the optical component 722 includes a corresponding region 805 in which an augmented reality image is provided. The regions 804 and 805 are assumed to have a width of x3. In practice, the width of the opacity filter region 804 may be slightly wider than that of the augmented reality image portion 805. Further, the opacity filter region 804 is at a distance of x1 from a left side of the opacity filter, and at a distance x2 from a right side of the opacity filter. Thus, x1+x2+x3=w2. The augmented reality image portion 805 is at a distance of x4 from a left side of the optical component 722, and at a distance x5 from a right side of the optical component 722. Thus, x4+x5+x3=w1. The element 800 of the real-world scene has a width xrw>x3 and is blocked from reaching the eye 706 by the region 804 of the opacity filter.

FIG. 8A2 depicts a front-facing view of the real-world scene element 800 of FIG. 8A1.

FIG. 8A3 depicts a front-facing view of the opacity filter region 804 of FIG. 8A1. FIG. 8A4 depicts a front-facing view of the augmented reality image region 805 of FIG. 8A1.

FIG. 8B1 depicts a registration of a real-world image and an increased-opacity region of an opacity filter when the user's eye is in a second location relative to a frame of the HMD device. A top view is depicted. In this example, the frame is shifted to the left relative to the eye 706. The opacity filter 750 includes a region 806 with an increased opacity, while the optical component 722 includes a corresponding region 807 in which an augmented reality image is provided. The regions 806 and 807 are assumed to have a width of x3. Further, the opacity filter region 806 is at a distance of x1'>x1 from a left side of the opacity filter, and at a distance x2'<x2 from a right side of the opacity filter. Thus, x1'+x2'+x3=w2. The augmented reality image portion 807 is at a distance of x4' from a left side of the optical component 722, and at a distance x5' from a right side of the optical component 722. Thus, x4'+x5'+x3=w1. Also, due to the shift, x4'>x4 and x5'<x5 in this example.

The element 800 of the real-world scene has a width xrw>x3 and is blocked from reaching the eye 706 by the region 806 of the opacity filter. By detecting the movement of the frame, the locations of the opacity region and/or the augmented reality image can be adjusted accordingly, such as by being shifted horizontally and/or vertically, while the user maintains a fixed line of sight to a real-world scene. This ensures that the augmented reality image appears in the same location of the real-world scene. The opacity region and the augmented reality image continue to be aligned or registered with one another and with the real-world scene.

In practice, since the increased-opacity region of the opacity filter appears to be closer to the eye than the distantly-focused augmented reality image, any change in the position of the increased-opacity region of the opacity filter is more noticeable compared to a similar change in the position of the augmented reality image. This is due to a greater parallax effect for the increased-opacity region of the opacity filter. Accordingly, an acceptable result can be obtained in many cases by adjusting a position of the increased-opacity region of the opacity filter without adjusting a position of the augmented reality image, based on the eye tracking. A shift in the position of the increased-opacity region of the opacity filter can be the same or similar to the shift in the location of the eye relative to the frame. A shift in the position of the augmented reality image can be a small fraction of the shift in the position of the increased-opacity region of the opacity filter.

Another point is that when the user is looking to the right, the left-side see-through lens and augmented reality image is not focused on, so that it may be sufficient to adjust the position of the increased-opacity region of the opacity filter, based on the eye tracking, for the right-side opacity filter only, and not the left-side opacity filter. Similarly, when the user is looking to the left, the right-side see-through lens and augmented reality image is not focused on, so that it may be sufficient to adjust the position of the increased-opacity region of the opacity filter, based on the eye tracking, for the left-side opacity filter only, and not the right-side opacity filter.

FIG. 8B2 depicts another view of the real-world scene element 800 of FIG. 8B1.

FIG. 8B3 depicts another view of the opacity filter region 804 of FIG. 8B1. FIG. 8B4 depicts another view of the augmented reality image region 805 of FIG. 8B1.

FIG. 9A1 depicts a registration of an augmented reality image and an increased-opacity region of an opacity filter, at a center of an augmented reality display region of a field of view of a user's eye. A top view is depicted. The scale of FIGS. 9A1, 9B1, 9D1, 9E1 and 9F1 is modified from that of FIGS. 8A1 and 8B1 by placing the opacity filter 750 and the optical component 722 further from the eye, to show further detail. As discussed, the eye has a field of view which is relatively wide. The opacity filter 750 is within a field of view with an angular extent of $\alpha 2$, such as about 60 degrees, bounded by lines 904 and 912, and the optical component 722, which provides the augmented reality image, is within a field of view with an angular extent of a1, such as about 20 degrees, bounded by lines 906 and 910. The field of view with an angular extent of $\alpha 1$ represents an angular extent of the augmented reality display region. Line 908 represents a straight ahead line of sight of the eye, which passes through a center of the augmented reality image 900 and the increased-opacity region 902. Further, a portion 902 of the opacity filter has an increased opacity and a corresponding portion of the optical component 900 provides the augmented reality image. The increased-opacity portion 902 of the opacity filter is behind the augmented reality image. This example depicts the augmented reality image and the increased-opacity region of the opacity filter being at the center of the augmented reality display region, and not at a boundary of the augmented reality display region (represented by boundary lines 906 and 910).

In one approach, the opacity filter has the ability to provide color, so that a high resolution, color image is provided in the central 20 degree (=/−10 degrees to the left and right) field of view, while the peripheral region (between +/−10 to 30 degrees to the left and right) uses the opacity filter to provide an increased opacity and color but at a lower resolution, and out of focus. For example, as the user moves his head side to side, we can adjust the position of the augmented reality image, such as the flying dolphin, so that the dolphin can move from the central 20 degree field of view to the peripheral regions, where the opacity filter represents the augmented reality image. This avoids a discontinuity which would result if the dolphin disappeared when it moved out of the central 20 degree field of view.

In this and the following figures, the augmented reality image and the increased-opacity regions are assumed to have a corresponding square or rectangular shape, for simplicity.

FIG. 9A2 depicts a front-facing view of the opacity filter region 902 of FIG. 9A1. FIG. 9A3 depicts a front-facing view of the augmented reality image region 900 of FIG. 9A1. FIG. 9B1 depicts a registration of an augmented reality image and an increased-opacity region of an opacity filter, at a peripheral boundary of the augmented reality display region of FIG. 9A1. Here, the augmented reality image 922 and the increased-opacity region 920 (both assumed to have a width of about d2) of the opacity filter are at the boundary 906 of the augmented reality display region (represented by boundary lines 906 and 910). A line 907 represents a line of sight through a center of the augmented reality image 922 and the increased-opacity region 920. α3 is an angular extent between lines 906 and 907.

As mentioned in connection with FIGS. 3A and 3B, it is possible to provide a gradual transition in opacity such as when the augmented reality image is at a boundary of the augmented reality display region, as is the case in FIG. 9B1. See below for further details of such a transition.

FIG. 9B2 depicts a front-facing view of the opacity filter region 920 of FIG. 9B1. FIG. 9B3 depicts a front-facing view of the augmented reality image region 922 of FIG. 9B1.

FIG. 9C1 depicts a gradual change in opacity as a function of a distance from a peripheral boundary of a field of view. The x-axis represents a horizontal distance from the boundary line 906 and the y-axis represents an opacity of a corresponding region of the opacity filter. In one option, represented by line 915, the opacity is at a maximum level at a distance of d1 to d2 from the boundary and decreases gradually to a minimum level at the boundary (x=0). See FIG. 9C2. The opacity is at the minimum level for x<0, outside the augmented reality display region. In another option, represented by line 916, the opacity is at a maximum level from x=0 to x=d2 from the boundary and decreases gradually outside the augmented reality display region to a minimum level over a distance |d3| from the boundary. See FIG. 9C3. The opacity is at the minimum level for x<d3, outside the augmented reality display region. In yet another option, represented by line 917, the opacity is at a maximum level from x=d4 to x=d2 and decreases gradually outside the augmented reality display region to a minimum level over a distance |d5|−|d4|. See FIG. 9C4. The opacity is at the minimum level for x<d5, outside the augmented reality display region.

FIG. 9C2 depicts an opacity filter region with a non-faded portion 931 and successively faded portions 932, 933 and 934, with fading between 0 and d1 in FIG. 9C1.

FIG. 9C3 depicts an opacity filter region with a non-faded portion 941 and successively faded portions 942, 943 and 944, with fading between 0 and d3 in FIG. 9C1.

FIG. 9C4 depicts an opacity filter region with a non-faded portion 951 and successively faded portions 952, 952 and 953, with fading between d4 and d5 in FIG. 9C1.

FIG. 9D1 depicts a registration of an augmented reality image and an increased-opacity region of an opacity filter, at a peripheral boundary of the augmented reality display region of FIG. 9A1, where an additional region of increased opacity is provided in a second, peripheral region of the field of view. A top view is depicted. Compared to FIG. 9B1, FIG. 9D1 adds an additional increased-opacity region 924 of the opacity filter 750. The additional increased-opacity region 924, which is outside the augmented reality display region, can provide a peripheral cue such as a shadow for the augmented reality image 922. The shadow can have a similar size and shape as the augmented reality image 922. The additional increased-opacity region 924 can be on the same level horizontally and/or above or below the augmented reality image 922 and/or the increased-opacity region 920. In this example, the increased-opacity region 924 is separated from the increased-opacity region 920 by a transmissive region of the opacity filter 750.

The second, peripheral region of the field of view, on a left peripheral side of the optical component 722, has an angular extent of (α2−α1)/2 (e.g., 10-30 degrees) between lines 904 and 906 on a left peripheral side of the optical component 722. A corresponding additional peripheral region has an angular extent of (α2−α1)/2 between lines 910 and 912 on a right peripheral side of the optical component 722.

FIG. 9D2 depicts a front-facing view of the opacity filter regions 920 and 924 of FIG. 9D1.

FIG. 9D3 depicts a front-facing view of the augmented reality image region 900 of FIG. 9D1.

FIG. 9E1 depicts a registration of a first portion of an augmented reality image and an increased-opacity region of an opacity filter, at a peripheral boundary of the augmented reality display region of FIG. 9A1, where an additional region of increased opacity is provided in a second, peripheral region of the field of view to represent a second, cutoff portion of the augmented reality image. A top view is depicted. Here, the augmented reality image portion 922, with width d2, represents a first portion of the augmented reality image, and an increased-opacity region 926 of the opacity filter 750 is behind the augmented reality image portion 922. An augmented reality image portion 923, of width d2', which is not actually present, represents where a second, cutoff portion of the augmented reality image would be located, based on the position of the augmented reality image portion 922. In this case, an additional increased-opacity region 928 of the opacity filter 750 (which can be a continuation of the increased-opacity region 926) is provided behind the augmented reality image portion 923 to avoid an abrupt cutoff in the augmented reality image. The additional increased-opacity region 928 can end with a step change to a minimum opacity, or can be provided with a gradual change in opacity, using an approach which is analogous to the discussion of FIG. 9C1.

In one approach, the additional increased-opacity region 928 has a similar size, shape location and/or color as the augmented reality image portion 923, so that it essentially represents the augmented reality image portion 923 which is not actually present.

FIG. 9E2 depicts a front-facing view of the opacity filter regions 926 and 928 of FIG. 9E1.

FIG. 9E3 depicts a front-facing view of the augmented reality image regions 922 and 923 of FIG. 9E1.

FIG. 9F1 depicts an increased-opacity region 960 of an opacity filter 750 in a second, peripheral region of a field of view, at a time when no augmented reality image is provided by the optical component 722. A top view is depicted. One or more increased-opacity regions can be provided in either peripheral region, on the right or left side.

As discussed, the increased-opacity region 960 can represent a lower resolution and out-of-focus version of the augmented reality image. This can be useful, e.g., when the user moves his head to the side so that the augmented reality image moves out of the central 20 degree field of view to a peripheral region of the field of view. This movement could be represented by the sequence of FIG. 9A1, where the augmented reality image 900 is in the central field of view, followed by the FIG. 9B1, where the augmented reality image 920 is at a boundary of the central field of view, followed by the FIG. 9F1, where the opaque region 960 (representing the augmented reality image) is in the peripheral region of the field of view. As the user moves his head back to the starting position, the sequence can be reversed.

The increased-opacity pixels of the opacity filter in the peripheral region can have a corresponding shape as the augmented reality image, and/or a corresponding color when the opacity filter has a color capability. The positioning and timing of the increased-opacity pixels of the opacity filter can be set to provide a smooth transition based on movement of the augmented reality image. For example, as the augmented reality image reaches the boundary of the central field of view, the opacity filter can be activated accordingly to provide a corresponding shape and movement in the peripheral region as a representation of the augmented reality image. Subsequently, as the representation of the augmented reality image moves toward the boundary of the central field of view, the opacity filter can be deactivated and the augmented reality image can be activated accordingly to provide a corresponding shape and movement in the central field of view.

FIG. 9F2 depicts a front-facing view of the opacity filter region 960 of FIG. 9F1.

FIG. 9F3 depicts a front-facing view of the augmented reality image of FIG. 9F1.

As can be seen, a number of advantages are provided. For example, a relatively streamlined HMD apparatus is provided. Furthermore, calibration between the eye, the primary color display, and the opacity filter is provided using eye tracking and psycho-perceptual techniques. The opacity filter can be used to provide peripheral vision cues even where there is no primary display providing virtual imagery. For color-based opacity filters, we can seamlessly blend the peripheral color area with the central focus area for a better overall experience, and transition to opacity-only-filtering inside the focus area.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. An optical see-through head-mounted display device, comprising:
a see-through lens comprising an augmented reality display region and an opacity filter, the opacity filter comprising a plurality of pixels, each pixel is controllable to adjust an opacity of the pixel, and the augmented reality display region extends in a field of view between a first boundary line and second boundary line of the field of view;
at least one augmented reality emitter which emits light to an eye of a user via the augmented reality display region, the light represents an augmented reality image having a boundary; and
at least one control circuit, the at least one control circuit is configured to cause the opacity filter to provide a region having a shape which corresponds to a shape of the augmented reality image, to provide the region with an opacity which is relatively high when the augmented reality image is at least a specified distance from the first boundary line and the second boundary line, and to provide a gradual transition in the opacity to a relatively low opacity as a head of the user moves sideward and the augmented reality image moves correspondingly toward the first boundary line, the gradual transition is based on a distance between the first boundary line and the boundary of the augmented reality image.

2. The optical see-through head-mounted display device of claim 1, wherein:
the at least one control circuit is configured to provide the opacity filter with a region of pixels with the relatively high opacity and a region of pixels with the gradual transition in opacity, adjacent to the region of pixels with the relatively high opacity.

3. The optical see-through head-mounted display device of claim 1, wherein:
the opacity filter comprises a region of pixels with the relatively high opacity and a region of pixels with the gradual transition in opacity; and
the at least one control circuit is configured to provide the region of pixels with the relatively high opacity and the region of pixels with the gradual transition in opacity behind the augmented reality image, from a perspective of the eye of the user.

4. The optical see-through head-mounted display device of claim 1, wherein:
the at least one control circuit is configured to provide the opacity filter with a region of pixels with the relatively high opacity behind the augmented reality image, from a perspective of the eye of the user and a region of pixels with the gradual transition in opacity peripherally outside the augmented reality image, from the perspective of the eye of the user.

5. The optical see-through head-mounted display device of claim 1, wherein:
the at least one control circuit is configured to provide the opacity filter comprises with region of pixels with the relatively high opacity which extends behind the augmented reality image and peripherally outside the augmented reality image, from a perspective of the eye of the user, and a region of pixels with the gradual transition in opacity peripherally outside the augmented reality image, from the perspective of the eye of the user.

6. The optical see-through head-mounted display device of claim 1, wherein:
the opacity filter has an angular extent which extends peripherally past an angular extent of the augmented reality display region; and
when the boundary of the augmented reality image is at the first boundary line, the at least one control circuit is configured to provide the gradual transition in opacity for pixels of the opacity filter which are in a portion of the opacity filter which extends peripherally past the angular extent of the augmented reality display region.

7. The optical see-through head-mounted display device of claim 1, wherein:
the augmented reality image comprises a first portion of a virtual object; and
when the boundary of the augmented reality image is at the first boundary line, the at least one control circuit is configured to provide the pixels of the opacity filter for which the gradual transition in opacity is provided to represent a size and shape of a second portion of the virtual object, as a continuation of the virtual object, in a portion of the opacity filter which is peripherally beyond the boundary of the augmented reality display region.

8. The optical see-through head-mounted display device of claim 1, wherein:
the at least one control circuit is configured to not provide the pixels of the opacity filter for which the gradual transition in opacity is provided behind the augmented reality image, from a perspective of the eye of the user, based on the distance from the boundary of the augmented reality image.

9. The optical see-through head-mounted display device of claim 1, wherein:
the at least one control circuit is configured to provide the pixels of the opacity filter for which the gradual transition in opacity is provided behind the augmented reality image, from a perspective of the eye of the user, based on the distance from the boundary of the augmented reality image.

10. The optical see-through head-mounted display device of claim 1, wherein:
the at least one control circuit is configured to gradually fade out the augmented reality image in correspondence with the gradual transition in opacity.

11. A method for displaying an augmented reality image on a head-mounted display device, comprising:
emitting light to an eye of a user via an augmented reality display region of the head-mounted display device, the light represents an augmented reality image, the augmented reality image comprises a virtual object having a size and shape;
causing an opacity filter of the head-mounted display device to provide a first region of increased opacity, the first region of increased opacity is separated from the virtual object and corresponds to the size and shape of the virtual object; and
causing the opacity filter to provide a second region of increased opacity which is behind the virtual object, from a perspective of the eye of the user, the second region of increased opacity is separated from the first region of increased opacity by a transmissive region of the opacity filter.

12. The method of claim 11, further comprising:
using the first region of increased opacity region to accentuate movement of the virtual object.

13. The method of claim 11, wherein:
the second region of increased opacity is spaced apart horizontally and is on a same level horizontally as the first increased opacity region.

14. The method of claim 11, wherein:
the second region of increased opacity has a size and shape which corresponds to the size and shape of the virtual object.

15. The method of claim 11, wherein:
the first region of increased opacity is in a region of the opacity filter which extends peripherally beyond the augmented reality display region.

16. The method of claim 11, wherein:
the first region of increased opacity has a color corresponding to a color of the virtual object.

17. An optical see-through head-mounted display device, comprising:
a see-through lens comprising an augmented reality display region and an opacity filter, the opacity filter comprising a plurality of pixels, each pixel is controllable to adjust an opacity of the pixel, the augmented reality display region extends in a central field of view between a first boundary line and a second boundary line, the opacity filter extends in a field of view, the field of view of the opacity filter comprises a central portion which is behind the augmented reality display region from a perspective of an eye of a user and a peripheral portion which is peripheral to the central portion from the perspective of the eye of the user;
at least one augmented reality emitter which emits light to the eye of the user via the augmented reality display region, the light represents an augmented reality image which has a shape and a movement; and
at least one control circuit, the at least one control circuit is configured to make a detection of when the augmented reality image reaches the first boundary line as a head of the user moves sideward and the augmented reality image moves correspondingly toward the first boundary line, and in response to the detection, activate the opacity filter to provide a region of increased-opacity pixels in the peripheral portion of the field of view of the opacity filter, the region of increased-opacity pixels represents the augmented reality image.

18. The optical see-through head-mounted display device of claim 17, wherein:
the region of increased-opacity pixels has a shape and a movement based on the shape and the movement, respectively, of the augmented reality image in the augmented reality display region.

19. The optical see-through head-mounted display device of claim 17, wherein:
the at least one control circuit is configured to deactivate the region of increased-opacity pixels when the region of increased-opacity pixels moves toward the first boundary line.

20. The optical see-through head-mounted display device of claim 19, wherein:
the at least one control circuit is configured to deactivate the augmented reality image after the augmented reality image reaches the first boundary line and to activate the augmented reality image when the region of increased-opacity pixels moves toward the first boundary line.

* * * * *